(12) United States Patent
Han et al.

(10) Patent No.: US 11,781,471 B2
(45) Date of Patent: Oct. 10, 2023

(54) TURBO-COMPOUNDING SYSTEM

(71) Applicant: Doosan Infracore Co., Ltd., Incheon (KR)

(72) Inventors: Youngdeok Han, Incheon (KR); Dockoon Yoo, Incheon (KR); Junjung Park, Incheon (KR); Jongyoon Lee, Incheon (KR); Jayun Cho, Incheon (KR); Euna Kang, Incheon (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 34 days.

(21) Appl. No.: 17/413,072

(22) PCT Filed: Dec. 9, 2019

(86) PCT No.: PCT/KR2019/017289
§ 371 (c)(1),
(2) Date: Jun. 11, 2021

(87) PCT Pub. No.: WO2020/122526
PCT Pub. Date: Jun. 18, 2020

(65) Prior Publication Data
US 2022/0025812 A1   Jan. 27, 2022

(30) Foreign Application Priority Data
Dec. 13, 2018   (KR) .................. 10-2018-0160516

(51) Int. Cl.
*F02B 37/12*   (2006.01)
*B60H 1/00*   (2006.01)
(Continued)

(52) U.S. Cl.
CPC ......... *F02B 37/12* (2013.01); *B60H 1/00507* (2013.01); *F01P 5/04* (2013.01);
(Continued)

(58) Field of Classification Search
CPC .......... F02B 37/04; F02B 37/10; F02B 37/12; F02B 39/10; F02D 41/0007; B60H 1/00407; F01P 5/04; F01P 2005/046; F01P 5/12; Y02T 10/12
See application file for complete search history.

(56) References Cited

U.S. PATENT DOCUMENTS 3,394,682 A * 7/1968 Bensinger ................. F01P 5/02
236/35
6,557,347 B1 * 5/2003 Alvarez .............. F02D 41/0007
60/601
(Continued)

FOREIGN PATENT DOCUMENTS

CN   102472161 A   5/2012
CN   204511642 U   7/2015
(Continued)

OTHER PUBLICATIONS

International Search Report dated Mar. 17, 2020, corresponding to International Application No. PCT/KR2019/017289 citing the above reference(s).
(Continued)

*Primary Examiner* — Loren C Edwards
(74) *Attorney, Agent, or Firm* — Hauptman Ham, LLP (57) ABSTRACT

A turbo-compounding system according to an exemplary embodiment of the present invention includes: a turbocharger including a turbine which is rotated by using pressure of exhaust gas discharged from the engine and a compressor which is rotated by using rotation power of the turbine and compresses new external air and supplies the compressed air to the engine; a motor-generator configured to be rotated by using rotation power of the compressor of the turbocharger to generate power or add rotation power to the compressor of the turbocharger; and a control device configured to operate the motor-generator as a motor or a
(Continued)

generator according to a current rotation speed of the engine and may collect power wasted from the engine.

9 Claims, 6 Drawing Sheets (51) Int. Cl.
*F01P 5/04* (2006.01)
*F01P 5/12* (2006.01)
*F02B 37/04* (2006.01)
*F02B 39/10* (2006.01)

(52) U.S. Cl.
CPC ............... *F01P 5/12* (2013.01); *F02B 37/04* (2013.01); *F02B 39/10* (2013.01); *F01P 2005/046* (2013.01)

(56) References Cited

U.S. PATENT DOCUMENTS

| 2003/0005695 A1* | 1/2003 | Allen | F02D 41/0007 60/608 |
| 2011/0022289 A1* | 1/2011 | Hofbauer | F02M 26/46 123/565 |
| 2013/0269342 A1* | 10/2013 | Oh | F02B 39/10 60/273 |

FOREIGN PATENT DOCUMENTS

| CN | 105781716 A | 7/2016 |
| JP | H6-288246 A | 10/1994 |
| JP | 2006-226155 A | 8/2006 |
| JP | 2006-307787 A | 11/2006 |
| KR | 10-1997-0044699 A | 7/1997 |
| KR | 10-2001-0071191 A | 7/2001 |
| KR | 10-1236705 B1 | 2/2013 |
| KR | 10-2014-0063664 A | 5/2014 |
| KR | 10-2016-0036270 A | 4/2016 |

OTHER PUBLICATIONS

Korean Office Action dated Jun. 19, 2023, in connection with the Korean Patent Application No. 10-2021-7018063, 10 pages.
Chinese Office Action dated Jul. 29, 2022, in connection with the Chinese Patent Application No. 201980082119.9, 13 pages.

* cited by examiner

TURBO-COMPOUNDING SYSTEM

CROSS-REFERENCE TO RELATED APPLICATION

This present application is a national stage filing under 35 U.S.C § 371 of PCT application number PCT/KR2019/017289 filed on Dec. 9, 2019, which is based upon and claims the benefit of priority to Korean Patent Application No. 10-2018-0160516 filed Dec. 13, 2018 in the Korean Intellectual Property Office. The disclosures of the above-listed applications are hereby incorporated by reference herein in their entireties.

TECHNICAL FIELD

The present invention relates to a turbo-compounding system, and more particularly, to a turbo-compounding system which recovers power wasted from an engine.

BACKGROUND ART

Research on the recovery of waste energy is being actively conducted because a considerable amount of energy is wasted even in an internal combustion engine, which comes to have high efficiency as a result of remarkable technological development in recent years. Currently, the most actively researched fields for waste energy recovery include a turbo-compounding system that recovers the kinetic energy of exhaust gas and the Rankine stream cycle. Among them, the turbo-compounding system is easier to be applied than other waste energy recovery methods and has considerable waste energy recovery efficiency, so that a lot of research and development is being actively conducted.

The turbo-compounding system is generally divided into a mechanical type and an electric type, and the mechanical type is a method of transmitting power generated in a turbine of a turbocharger to a crankshaft through a turbine shaft and a gear, and the electric type is a method of converting power generated in a turbine of a turbocharger into electric energy and utilizing the converted electric energy.

The Electric Turbo-Compounding System (E-TCS) is the technology in which a motor-generator is converged to the existing turbocharger. Further, the electric turbo-compounding system may be divided into an integral type and a separate type again. In the separate-type E-TCS, the turbine and the motor-generator of the existing turbocharger are separated, and in the integral E-TCS, the turbocharger and the motor-generator are provided as one constituent element. Herein, the motor-generator acts as a motor to improve performance of the turbocharger or acts as a generator to convert rotational power of the turbocharger into electric energy.

However, the control of when to operate the motor-generator as a motor and when to operate as a generator is inevitably changed for each equipment to which the turbo-compounding system is applied. However, there is a demand for a turbo-compounding system controlled to basically maintain fuel efficiency of an engine at the same level while a motor-generator generates power when a rotation speed of the engine is in a relatively high or medium speed range, and improve performance of the engine when the rotation speed of the engine is in a low speed range.

DISCLOSURE

Technical Problem

An exemplary embodiment of the present invention provides a turbo-compounding system which is capable of improving fuel efficiency and performance of an engine.

Technical Solution

According to an exemplary embodiment of the present invention, a turbo-compounding system which recovers power wasted in an engine includes: a turbocharger including a turbine which is rotated by using pressure of exhaust gas discharged from the engine and a compressor which is rotated by using rotation power of the turbine and compresses new external air and supplies the compressed air to the engine; a motor-generator configured to be rotated by using rotation power of the compressor of the turbocharger to generate power or add rotation power to the compressor of the turbocharger; and a control device configured to operate the motor-generator as a motor or a generator according to a current rotation speed of the engine.

The control device may operate the motor-generator as the motor or the generator in consideration of a current air-fuel ratio of the engine and a current rotation speed of the turbocharger together with a current rotation speed of the engine.

Further, in the case where the rotation speed of the engine is equal to or larger than a preset reference engine rotation speed and the air-fuel ratio is equal to or larger than a preset first reference air-fuel ratio, in the case where the rotation speed of the engine is equal to or larger than the reference engine rotation speed and the air-fuel ratio of the engine is less than the first reference air-fuel ratio, but a rotation speed of the turbocharger is equal to or larger than a preset reference turbocharger rotation speed, and in the case where the rotation speed of the engine is less than the reference engine rotation speed but the air-fuel ratio is equal to or larger than a preset second reference air-fuel ratio, the control device may operate the motor-generator in a generating mode. Further, in the case where the rotation speed of the engine is equal to or larger than the reference engine rotation speed, the air-fuel ratio is less than the first reference air-fuel ratio, and the rotation speed of the turbocharger is also less than the reference turbocharger rotation speed, and in the case where the rotation speed of the engine is less than the reference engine rotation speed and the air-fuel ratio is less than the second reference air-fuel ratio, the control device may operate the motor-generator in a motoring mode.

The motor-generator may be relatively adjacent to the compressor of the turbocharger and be relatively far apart from the turbine. Further, the turbo-compounding system may further include a power transmission shaft which connects the compressor of the turbocharger and the motor-generator.

Further, the turbo-compounding system may further include a transmission which is installed on the power transmission shaft which connects the motor-generator and the turbocharger, and shifts rotation power of any one of the turbocharger and the motor-generator to a rotation speed and transmits the shifted rotation speed to the remaining one. Further, the control device may maintain the rotation speed of the motor-generator at a preset target rotation speed when the motor-generator is operated in the generating mode.

Further, the turbo-compounding system may further include: a power converting device which converts and controls power generated in the motor-generator; and an energy storage device which stores the power converted by the power converting device.

The power stored in the energy storage device may be supplied to one or more of a cooling fan, a coolant pump, an air-conditioner, and an air compressor.

Advantageous Effects

According to the exemplary embodiment of the present invention, the turbo-compounding system may improve fuel efficiency and performance of an engine.

BEST MODE

Hereinafter, an exemplary embodiment of the present invention will be described in detail with reference to accompanying drawings so as for those skilled in the art to easily carry out. The present invention can be implemented in various forms and is not limited to the exemplary embodiment described herein.

It should be noted that the drawings are schematic and not drawn to scale. Relative dimensions and proportions of parts in the drawings are shown exaggerated or reduced in size for clarity and convenience in the drawing, and a predetermined dimension is simply illustrative only and not limiting. Further, the same reference numerals are used for the same structure, element, or component shown in the two or more drawings in order to denote like features.

An exemplary embodiment of the present invention specifically represents an ideal embodiment of the present invention. As a result, various modifications of the drawings are expected. Accordingly, the exemplary embodiment is not limited to a specific form of the illustrated area, and includes, for example, a shape modification by manufacturing.

Hereinafter, a turbo-compounding system 101 according to an exemplary embodiment of the present invention will be described with reference to FIGS. 1 to 3.

The turbo-compounding system 101 according to the exemplary embodiment of the present invention is for the purpose of recovering power wasted in an engine 100, and is applicable to both a gasoline engine and a diesel engine. In particular, for example, the turbo-compounding system 101 may be used for various construction machines, such excavators, wheel loaders, forklifts, and drilling machines, as well as buses, trucks, ships, and generators.

Figure 1:
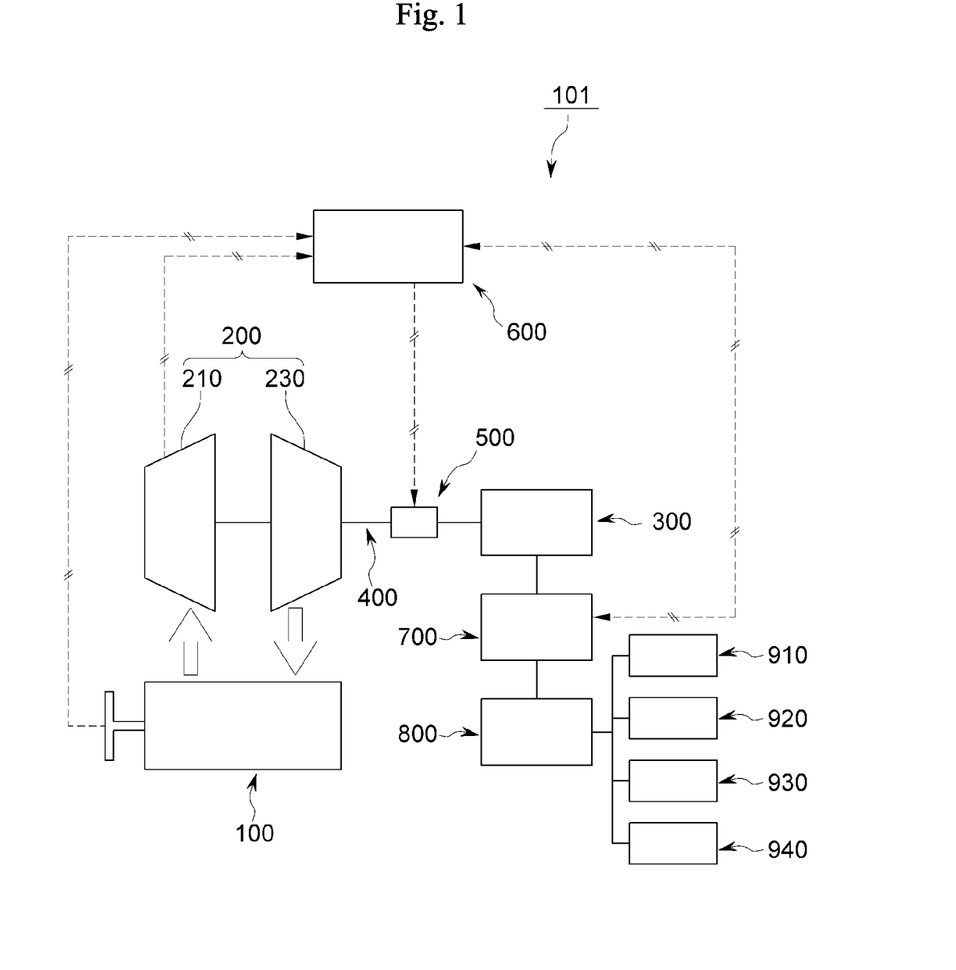
FIG. 1 is a configuration diagram illustrating a turbo-compounding system according to an exemplary embodiment of the present invention.

As illustrated in FIG. 1, the turbo-compounding system 101 according to the exemplary embodiment of the present invention includes a turbocharger 200, a motor-generator 300, and a control device 600.

Further, the turbo-compounding system 101 according to the exemplary embodiment of the present invention may further include a power transmission shaft 400, a power converting device 700, and an energy storage device 800.

The turbocharger 200 includes a turbine 210 and a compressor 230. The turbine 210 is rotated by using pressure of exhaust gas discharged from the engine 100. The compressor 230 receives rotation power from the turbine 210 to be rotated, and compresses new external air and supplies the compressed air to the engine 100. In this case, the turbine 210 and the compressor 230 may be coaxially connected. That is, the turbine 210 and the compressor 230 are rotated at the same rotation speed.

The motor-generator 300 may generate electric energy by being rotated by using the rotation power of the compressor 230 of the turbocharger 200, or conversely, may add the rotation power to the compressor 230 of the turbocharger 200. In particular, the motor-generator 300 may operate separately in a motoring mode or a generating mode under the control of the control device 600 which is to be described below. When the motor-generator 300 is operated in the motoring mode, the motor-generator 300 adds the rotation power to the compressor 230 of the turbocharger 200. That is, the motor-generator 300 increases the rotation speed of the compressor 230. On the other hand, when the motor-generator 300 is operated in the generating mode, the motor-generator 300 receives the rotation power from the compressor 230 of the turbocharger 200 to generate power.

The power transmission shaft 400 connects the compressor 230 of the turbocharger 200 and the motor-generator 300. That is, by the power transmission shaft 400, the rotation power of the compressor 230 may be transmitted to the motor-generator 300 or conversely, the rotation power of the motor-generator 300 may be transmitted to the compressor 230. Accordingly, the motor-generator 300 may generate power by recovering waste energy from the turbocharger 200 or add the rotation power to the turbocharger 200 to improve performance of the turbocharger 200.

As described above, in the exemplary embodiment of the present invention, the motor-generator 300 is not disposed between the turbine 210 and the compressor 230 of the turbocharger 200. That is, the motor-generator 300 is connected to the compressor 230 through the power transmission shaft 400, but is spaced apart from the turbine 210 in distance. The motor-generator 300 is relatively adjacent to the compressor 230 between the compressor 230 and the turbine 210, but is relatively far apart from the turbine 210. Accordingly, according to the exemplary embodiment of the present invention, the motor-generator 300 may be less affected by a high temperature of the turbine 210. Further, the motor-generator 300 is installed away from a narrow space between the turbine 210 and the compressor 230 of the turbocharger 200, so that a space for implementing a cooling system for cooling the motor-generator 300 may also be secured relatively comfortably.

Accordingly, the turbo-compounding system 101 according to the exemplary embodiment of the present invention may also improve cooling efficiency and durability.

According to the illustrative exemplary embodiment, a transmission 500 may be installed between the power transmission shaft 400 and the motor-generator 300. The transmission 500 may shift the rotation power of the power transmission shaft 400 transmitted to the motor-generator 300 to a rotation speed and transmit the shifted rotation speed, and shift the rotation power of the motor-generator 300 to a rotation speed and transmit the shifted rotation speed to the power transmission shaft 400. In particular, the transmission 500 may be disposed between the compressor 230 and the motor-generator 300, and when the motor-generator 300 generates power, the transmission 500 may rotate the motor-generator 300 at a lower rotation speed than that of the compressor 230. That is, the transmission 500 may decrease the rotation speed of the rotation power that the compressor 230 transmits to the motor-generator 300 when the motor-generator 300 generates power.

Further, when the motor-generator 300 is operated in the generating mode, the transmission 500 may decrease the rotation speed of the motor-generator 300 to a rotation speed, that is, a target rotation speed, at which the motor-generator 300 has the maximum power generation efficiency or the maximum energy conversion efficiency.

In the meantime, when the transmission 500 does not decrease the rotation speed transmitted to the motor-generator 300, the motor-generator 300 is rotated at the same rotation speed as that of the turbine 210 of the turbocharger 200 as a result. However, the rotation speed at which the motor-generator 300 operates with optimum efficiency is different from the rotation speed of the turbine 210 of the turbocharger 200. For example, the turbine 210 of the turbocharger 200 generally has a rotation speed of 120,000 rpm or more. The rotation speed of the turbine 210 is much higher than the rotation speed at which the motor-generator 300 has the maximum power generation efficiency or the maximum energy conversion efficiency. However, in the exemplary embodiment of the present invention, it is possible to decrease the rotation speed of the rotation power that the compressor 230 transmits to the motor-generator 300 to the rotation speed at which the motor-generator 300 has the maximum power generation efficiency or the maximum energy conversion efficiency, by using the transmission 500.

Accordingly, the turbo-compounding system 101 according to the exemplary embodiment of the present invention may maximize power generation efficiency.

The power converting device 700 converts the power generated in the motor-generator 300 and stores the converted power in the energy storage device 800, and controls the motor-generator 300 to be driven in the generating mode or the motor-generator 300 to be driven in the motoring mode by using the power of the energy storage device 800. In particular, the power converting device 700 converts the power generated in the motor-generator 300 to a predetermined voltage and current. In this case, the predetermined voltage and current may be determined according to usage of the power generated in the motor-generator 300. Further, the power converting device 700 may make the motor-generator 300 to be driven in the motoring mode and provide the compressor 230 with power. The power converting device 700 may include a plurality of power control devices, and may make the motor-generator 300 be operated in the generating mode or the motoring mode under the switching control of the corresponding power control device.

The energy storage device 800 stores the power converted by the power converting device 700. For example, the energy storage device 800 may be a rechargeable battery. The power stored in the energy storage device 800 may be provided to any one or more of a cooling fan 910, a coolant pump 920, an air conditioner 930, and an air compressor 940 used in various construction machines, such as excavators, wheel loaders, forklifts, and drilling machines, or buses, trucks, ships, and generators, and the like to which the turbo-compounding system 101 is applied.

Further, the power stored in the energy storage device 800 may be utilized when the motor-generator 300 is operated in the motoring mode.

The control device 600 operates the motor-generator 300 as the motor or the generator by controlling the motor-generator 300 according to a current rotation speed of the engine 100. Further, the control device 600 may operate the motor-generator 300 as the motor or the generator by considering a current air-fuel ratio of the engine 100 and a current rotation speed of the turbocharger 200 together with the current rotation speed of the engine 100. Herein, the air-fuel ratio means a mixing ratio of air and fuel supplied to a combustion chamber of the engine 100. The driving switch of the driving in the motoring mode and the generating mode of the motor-generator 300 may be performed by controlling switch of the power control device of the power converting device 700 by the control device 600. Further, the control device 600 may receive a feedback of the switching result of the power control device in the power converting device 700, and receive a sensing signal for the voltage/current in the power converting device 700 for the control of the power converting device 700. The control device 600 may be integrally formed with the power converting device 700. In this case, various signals input to the control device 600 for the control of the motor-generator 300 may be input to the integrally formed power converting device 700.

Figure 6:
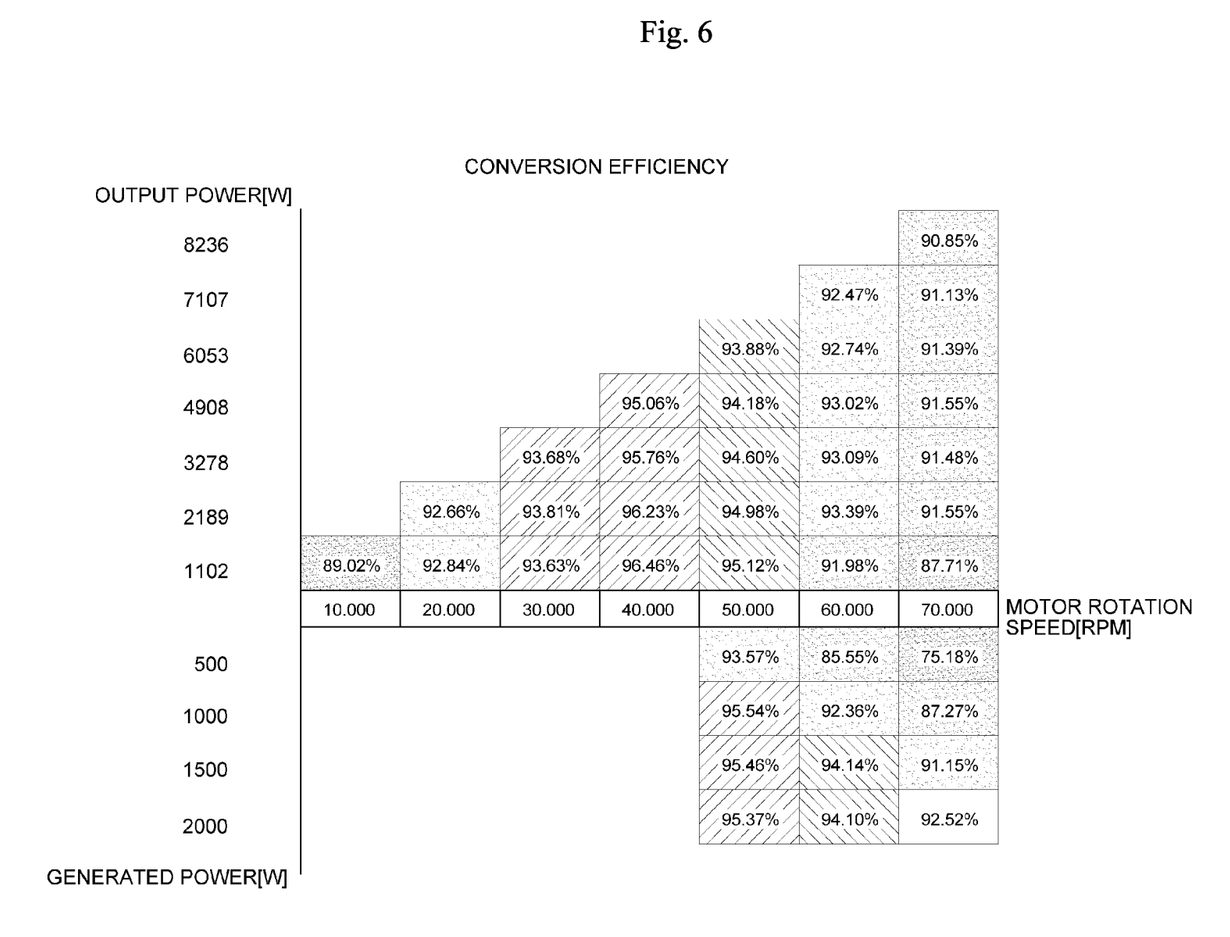
FIG. 6 is a graph illustrating generated power and energy conversion efficiency for each rotation speed of the motor-generator.

In the meantime, the control device 600 may receive information on the rotation speed of the engine 100 and the rotation speed of the turbocharger 200 from speed sensors embedded in the engine 100 and the turbocharger 200 or receive separately mounted rotation sensors. Further, the control device 600 may control the transmission 500 by comparing the current rotation speed of the motor-generator 300 with a predetermined target rotation speed. According to the illustrative exemplary embodiment, the control device 600 may feedback control the transmission 500 so that the current rotation speed of the motor-generator 300 follows the target rotation speed by continuously measuring the rotation speed of the shifted motor-generator 300. The target rotation speed of the motor-generator 300 may be preset with a rotation speed having optimum energy converting efficiency and generating efficiency according to a specification, performance, and an operation condition of the motor-generator 300. For example, as illustrated in FIG. 3, the target rotation speed of the motor-generator 300 may be set by utilizing the mapping graph. In particular, FIG. 6 is a graph illustrating generated power and energy conversion efficiency for each rotation speed of the motor-generator 300. The mapping graph may be prepared by experimentally operating the motor-generator 300.

Further, the target rotation speed at which the motor-generator 300 has the maximum generation efficiency or maximum energy conversion efficiency may be varied according to the change in the operation condition of the motor-generator 300. Accordingly, when the operation condition of the motor-generator 300 is changed, the transmission 500 may be feedback controlled so as to change the target rotation speed in real time by utilizing the mapping graph and follow the changed target rotation speed.

In the meantime, the target rotation speed of the motor-generator 300 may be preset with a rotation speed having the optimum energy conversion efficiency and generation efficiency according to the specification, performance, and operation condition of the motor-generator 300.

Further, the control device 600 may measure or estimate the air-fuel ratio of the engine 100 by various methods publicly known to those skilled in the art. For example, when a reference air-fuel ratio according to an acceleration signal for accelerating the engine 100 and the rotation speed of the engine 100 is preset in the control device 600 that controls the engine 100, the engine 100 injects fuel in accordance with the reference air-fuel ratio. Further, the control device 600 estimates the amount of air supplied to the engine 100 by measuring an oxygen concentration of exhaust gas discharged from the engine 100. That is, the control device 600 may calculate an actual air-fuel ratio by estimating the amounts of fuel and air supplied to the engine 10. In this case, when the amount of air estimated through the measurement of the oxygen concentration by comparing the air and the amount of fuel supplied to the engine 100 is large, this may be determined as lean combustion, and when the amount of air estimated through the measurement of the oxygen concentration by comparing the air and the amount of fuel supplied to the engine 100 is small, this may be determined as rich combustion. In the lean combustion, since the air ratio is larger than that of the rich combustion, stable combustion is achieved and thus carbon monoxide (CO) or hydrocarbon (HC) is less generated, and since the highest combustion temperature is not so high, nitrogen oxide (NOx) is less generated, which is advantageous in term of fuel economy, but the output is generally lower compared to rich combustion.

Hereinafter, an operation process of controlling, by the control device 600, the motor-generator 300 according to the exemplary embodiment of the present invention will be described in detail with reference to FIGS. 2 and 3.

Figure 2:
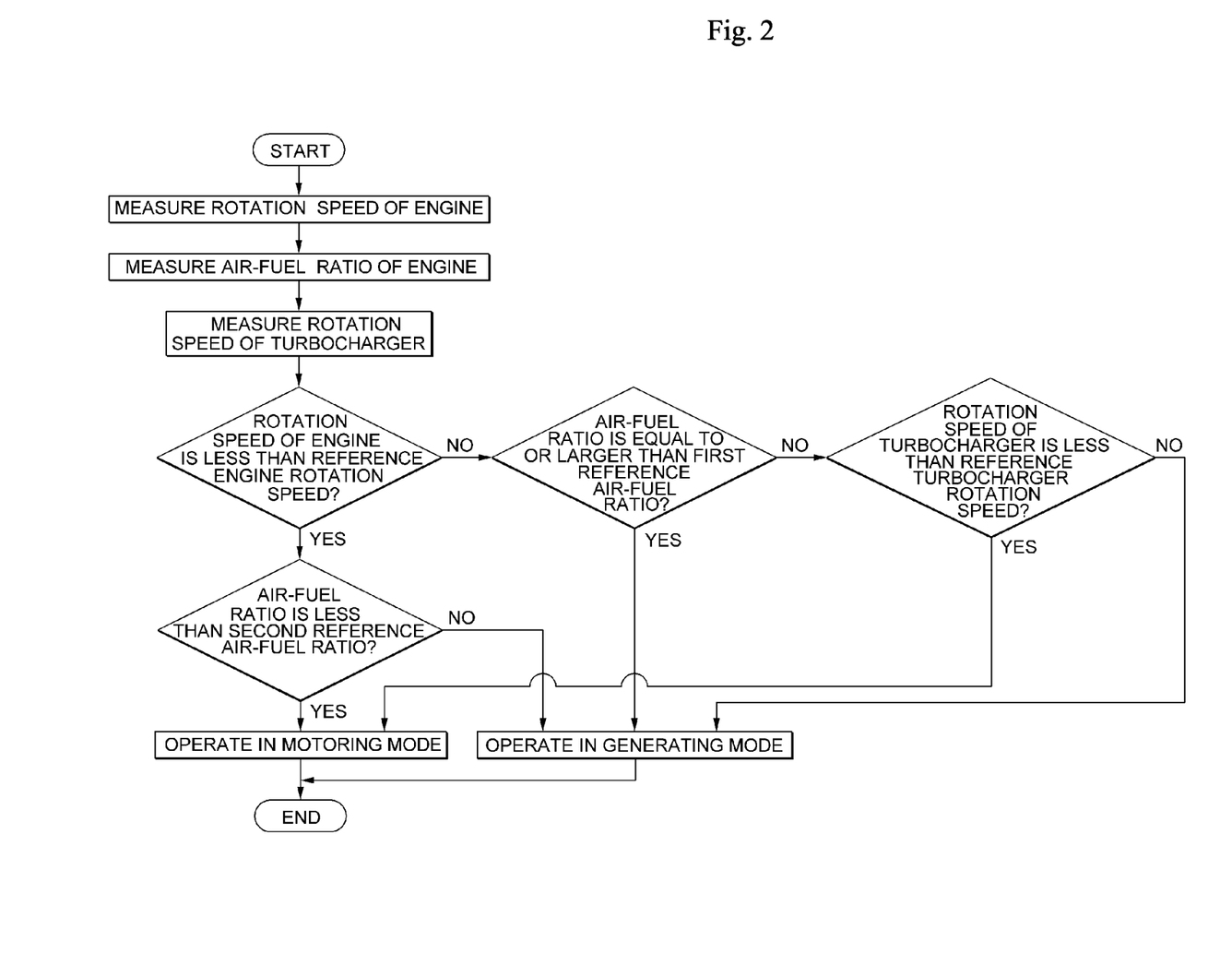
FIG. 2 is a flowchart illustrating an operation process of the turbo-compounding system of FIG. 1.
Figure 3:
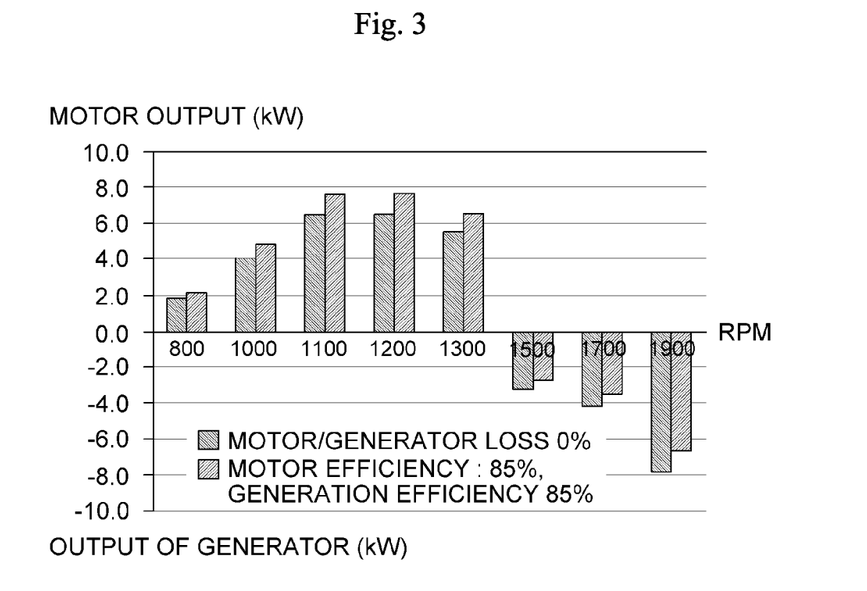
FIG. 3 is a graph illustrating an example of an output and efficiency according to a rotation speed of a motor-generator used in the turbo-compounding system of FIG. 1.

First, as illustrated in FIGS. 2 and 3, a rotation speed and an air-fuel ratio of the engine 100 and a rotation speed of the turbocharger 200 are measured.

Next, the control device 600 divides and operates the motor-generator 300 as the generating mode or the motoring mode by considering the rotation speed and the air-fuel ratio of the engine 100 and the rotation speed of the turbocharger 200.

In particular, in the case where the rotation speed of the engine 100 is equal to or larger than a preset reference engine rotation speed and the air-fuel ratio of the engine 100 is equal to or larger than a preset first reference air-fuel ratio, in the case where the rotation speed of the engine 100 is equal to or larger than the reference engine rotation speed and the air-fuel ratio of the engine 100 is less than the first reference air-fuel ratio, but a rotation speed of the turbocharger 200 is equal to or larger than a preset reference turbocharger rotation speed, and in the case where the rotation speed of the engine 100 is less than the reference engine rotation speed but the air-fuel ratio of the engine 100 is equal to or larger than a preset second reference air-fuel ratio, the control device 600 may operate the motor-generator 300 in the generating mode.

Herein, the reference engine rotation speed may be the rotation speed obtained by multiplying a value obtained by subtracting a rotation speed during no-load operation of the engine 100 from a rotation speed at the maximum output of the engine 100 by 0.55. Further, the reference turbocharger rotation speed may be the rotation speed obtained by multiplying the maximum speed of the turbocharger 200 by 0.6. Further, the first reference air-fuel ratio may be 20, and the first reference air-fuel ratio may be 18.

Further, in the case where the rotation speed of the engine 100 is equal to or larger than the reference engine rotation speed, the air-fuel ratio of the engine 100 is less than the first reference air-fuel ratio, and the rotation speed of the turbocharger 200 is also less than the reference turbocharger rotation speed, and in the case where the rotation speed of the engine 100 is less than the reference engine rotation speed and the air-fuel ratio of the engine 100 is less than the second reference air-fuel ratio, the control device 600 may operate the motor-generator 300 in the motoring mode.

FIG. 3 is a graph illustrating an example of an output and efficiency of the motor-generator 300 used in the turbo-compounding system 101 according to the exemplary embodiment of the present invention.

As illustrated in FIG. 3, when the rotation speed of the engine 100 is 1500 rpm to 1900 rpm, electric energy of about 3 kw to 8 kw may be generated by operating the motor-generator 300 in the generating mode. Further, the generated electric energy may be stored in the energy storage device 800 and then may be utilized when the motor-generator 300 is operated in the motoring mode. For example, the rotation speed of the engine 100 may be divided into a low-speed region of 800 rpm to 1200 rpm, and a medium-speed or high-speed region of 1300 rpm or more. That is, when the rotation speed of the engine 100 belongs to the medium-speed or high-speed region, energy is recovered by operating the motor-generator 300 in the generating mode, and then when the rotation speed of the engine 100 belongs to the low-speed region, the motor-generator 300 is operated in the motoring mode to improve performance of the engine 100.

Through the foregoing configuration, the turbo-compounding system 101 according to the exemplary embodiment of the present invention may improve fuel efficiency and performance of the engine 100.

Further, the turbo-compounding system 101 according to the exemplary embodiment of the present invention may also improve cooling efficiency and durability.

Hereinafter, a result of the experiment of torque and fuel efficiency for each rotation speed of the engine 100 in which an experimental example to which the turbo-compounding system 101 according to the exemplary embodiment of the present invention is applied is compared with a comparative example to which a general turbocharger is applied will be described with reference to FIGS. 4 and 5.

Figure 4:
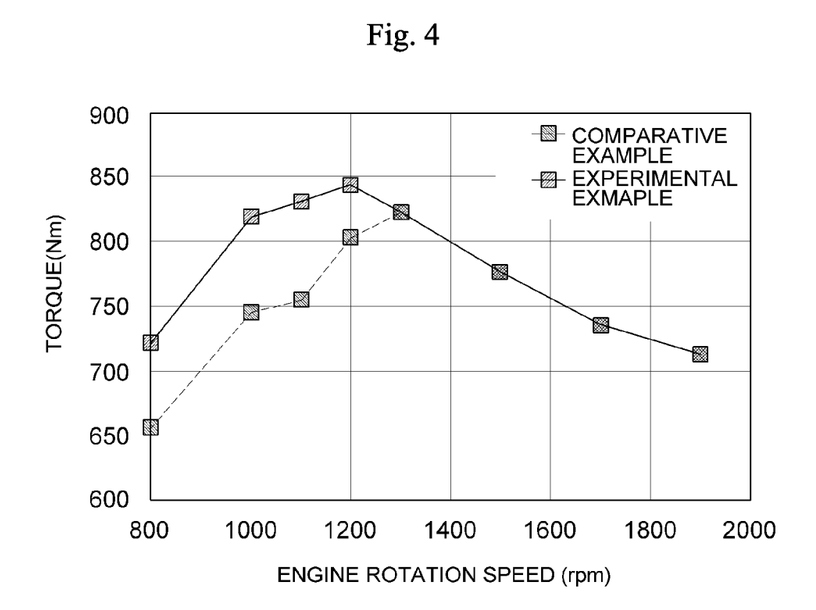
FIGS. 4 and 5 are graphs representing the comparison of the experimental results of an experimental example and a comparative example according to the exemplary embodiment of the present invention.
Figure 5:
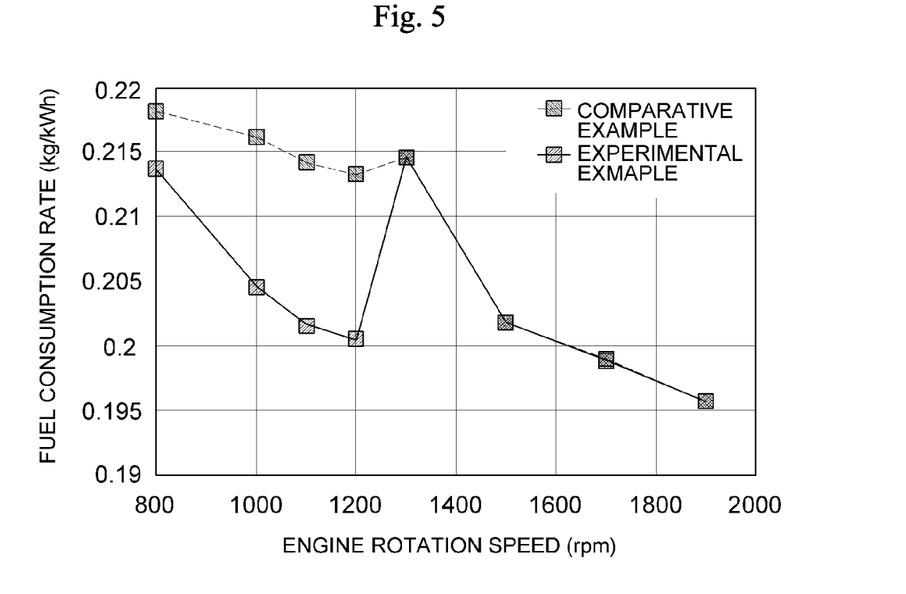

As illustrated in FIGS. 4 and 5, investigating the experimental example and the comparative example, it can be seen that when the rotation speed of the engine 100 is in the low-speed region corresponding to 800 rpm to 1200 rpm, the torque and the fuel efficiency of the engine 100 in the experimental example are relatively higher than those of the comparative example.

Further, it can be seen that when the rotation speed of the engine 100 is in the medium-speed or high-speed region of 1300 rpm or more, the torque and the fuel efficiency of the engine 100 in the experimental example are identical or similar to those of the comparative example.

That is, according to the exemplary embodiment of the present invention, by optimally controlling the operation of the motor-generator 300, the influence on the performance of the engine 100 may be minimized even when the motor-generator 300 is operated in the generating mode when the rotation speed of the engine 100 belongs to the medium-speed or high-speed region.

Further, it is possible to greatly improve performance of the engine 100 by operating the motor-generator 300 in the motoring mode by utilizing the electric energy generated when the motor-generator 300 is operated in the generating mode when the rotation speed of the engine 100 belongs to the low-speed region.

The exemplary embodiments of the present invention have been described with reference to the accompanying drawings, but those skilled in the art will understand that the present disclosure may be implemented in another specific form without changing the technical spirit or an essential feature thereof.

Accordingly, it will be understood that the aforementioned exemplary embodiments are described for illustrative and are not limited in all aspects, and it should be construed that the scope of the present disclosure shall be represented by the claims to be described below, and all of the changes or modified forms induced from the meaning and the scope of the claims, and an equivalent concept thereof are included in the scope of the present invention.

INDUSTRIAL APPLICABILITY

According to the exemplary embodiment of the present invention, the turbo-compounding system may be used for improving fuel efficiency and performance of the engine.

The invention claimed is:

1. A turbo-compounding system which recovers power wasted in an engine, the turbo-compounding system comprising:
   a turbocharger including a turbine, the turbine is rotated by using pressure of exhaust gas discharged from the engine and a compressor, the compressor is rotated by using rotation power of the turbine and compresses new external air creating a compressed air and supplies the compressed air to the engine;
   a motor-generator configured to be rotated by using rotation power of the compressor of the turbocharger to generate power or add rotation power to the compressor of the turbocharger; and
   a control device configured to operate the motor-generator as a motor or a generator according to a current rotation speed of the engine,
   wherein the control device operates the motor-generator as the motor or the generator in consideration of a current air-fuel ratio of the engine and a current rotation speed of the turbocharger together with the current rotation speed of the engine, and
   wherein
      in a case where the current rotation speed of the engine is equal to or larger than a preset reference engine rotation speed and the current air-fuel ratio is equal to or larger than a preset first reference air-fuel ratio, in a case where the current rotation speed of the engine is equal to or larger than the preset reference engine rotation speed and the current air-fuel ratio of the engine is less than the preset first reference air-fuel ratio, but the current rotation speed of the turbocharger is equal to or larger than a preset reference turbocharger rotation speed, and in a case where the current rotation speed of the engine is less than the preset reference engine rotation speed but the current air-fuel ratio is equal to or larger than a preset second reference air-fuel ratio, the control device operates the motor-generator in a generating mode, and
      in a case where the current rotation speed of the engine is equal to or larger than the preset reference engine rotation speed, the current air-fuel ratio is less than the preset first reference air-fuel ratio, and the current rotation speed of the turbocharger is also less than the preset reference turbocharger rotation speed, and in a case where the current rotation speed of the engine is less than the preset reference engine rotation speed and the current air-fuel ratio is less than the preset second reference air-fuel ratio, the control device operates the motor-generator in a motoring mode.

2. The turbo-compounding system of claim 1, wherein the motor-generator is relatively adjacent to the compressor of the turbocharger and is relatively far apart from the turbine, and
   the turbo-compounding system further includes a power transmission shaft which connects the compressor of the turbocharger and the motor-generator.

3. The turbo-compounding system of claim 2, further comprising:
   a transmission which is installed on the power transmission shaft, the power transmission shaft connects the motor-generator and the turbocharger, and shifts rotation power of any one of the turbocharger and the motor-generator to a rotation speed and transmits the shifted rotation speed to the remaining one of the turbocharger and the motor-generator,
   wherein the control device maintains the rotation speed of the motor-generator at a preset target rotation speed when the motor-generators is operated as the generator.

4. The turbo-compounding system of claim 2, further comprising:
   a power converting device which converts and controls a power generated in the motor-generator; and
   an energy storage device which stores the power converted by the power converting device.

5. The turbo-compounding system of claim 4, wherein the power stored in the energy storage device is supplied to one or more of a cooling fan, a coolant pump, an air-conditioner, and an air compressor.

6. The turbo-compounding system of claim 1, further comprising:
   a power converting device which converts and controls a power generated in the motor-generator; and
   an energy storage device which stores the power converted by the power converting device.

7. The turbo-compounding system of claim 6, wherein the power stored in the energy storage device is supplied to one or more of a cooling fan, a coolant pump, an air-conditioner, and an air compressor.

8. The turbo-compounding system of claim 1, further comprising:
   a power converting device which converts and controls a power generated in the motor-generator; and
   an energy storage device which stores the power converted by the power converting device.

9. The turbo-compounding system of claim 8, wherein the power stored in the energy storage device is supplied to one or more of a cooling fan, a coolant pump, an air-conditioner, and an air compressor.

* * * * *